No. 863,376. PATENTED AUG. 13, 1907.
R. & J. GAWRON.
FRICTION GEARING.
APPLICATION FILED MAY 8, 1906.
3 SHEETS—SHEET 1.
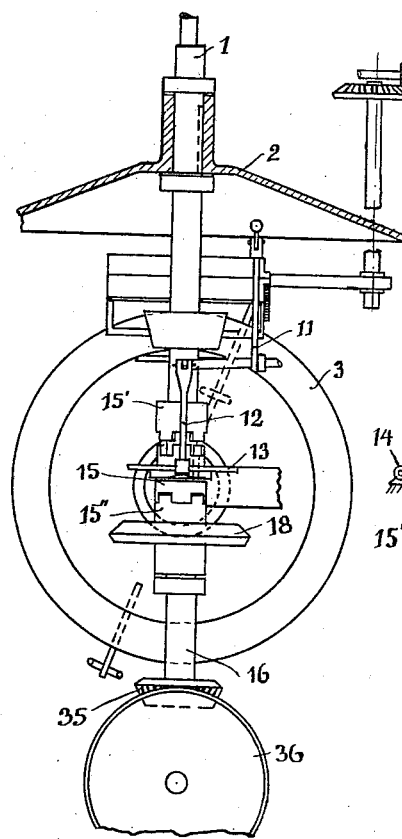
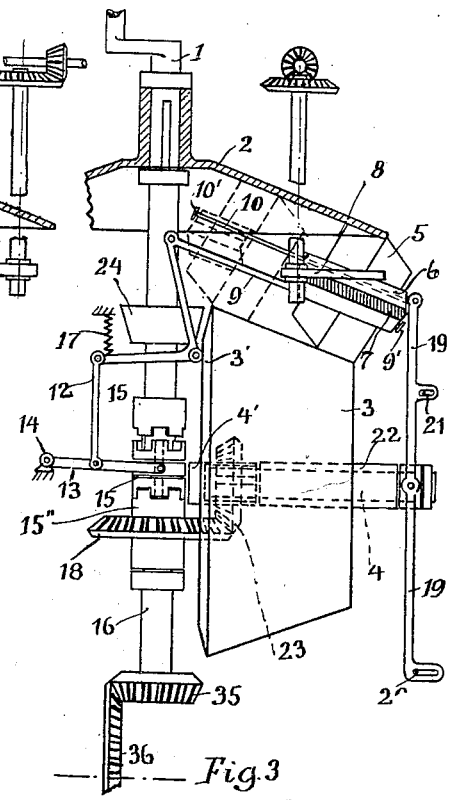
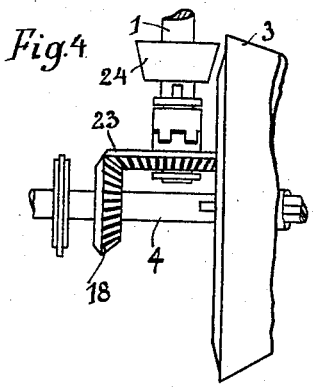
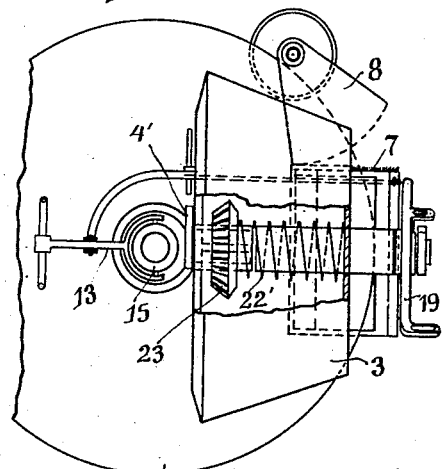
Witnesses:
Inventors
Rudolf Gawron
Josef Gawron
By James L. Norris.
Atty.

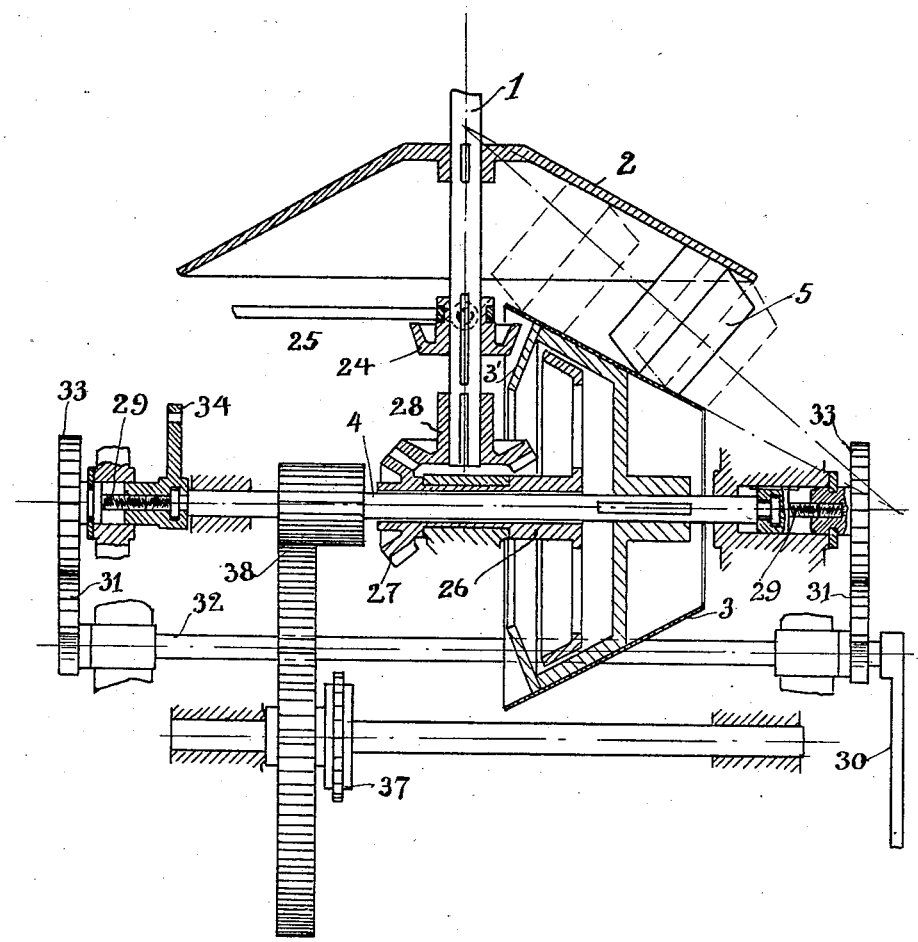

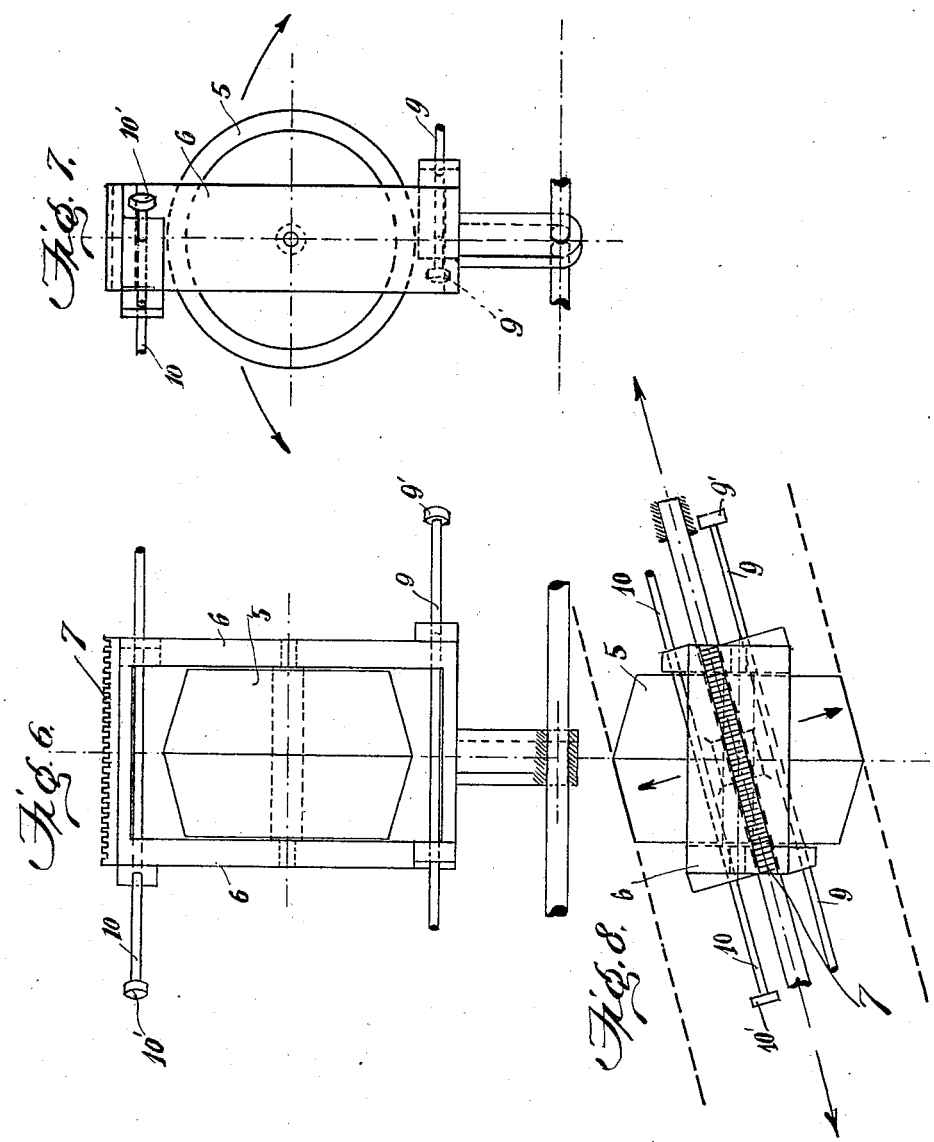

UNITED STATES PATENT OFFICE.

RUDOLF GAWRON, OF GREIFSWALD, AND JOSEF GAWRON, OF SCHÖNEBERG, NEAR BERLIN, GERMANY.

FRICTION-GEARING.

No. 863,376.   Specification of Letters Patent.   Patented Aug. 13, 1907.

Application filed May 8, 1906. Serial No. 315,813.

*To all whom it may concern:*

Be it known that we, RUDOLF GAWRON and JOSEF GAWRON, engineers, subjects of the King of Prussia, residing in Germany, the first named of ourselves at Greifswald, the second named at Schöneberg, near Berlin, Germany, have invented new and useful Improvements in Friction-Gearing Especially for Motor-Cars, of which the following is a specification.

The invention relates to friction gearing, and has for its object the provision of a friction gearing appropriate especially for motor cars with a friction wheel which is movable between two rotatable elements, such as a conical disk and roller and is formed as a circumferential friction wheel or a double conical friction wheel.

The invention consists essentially in forming the conical disk as a hollow cone. This driving hollow cone is arranged at right angles to the driven conical roller which can be moved along its axle away from the friction wheel into an end position in which the friction wheel is thrown out of gear and the movement of the driving shaft is transferred by a coupling.

The accompanying drawings illustrate different possible ways of making the device in accordance and suitable for carrying out the invention in which Figure 1 shows the gearing with a section of the hollow cone; Fig. 2 a side elevation of the gearing without the friction wheel; Fig. 3 a plan view of the gearing with a part section through the driven cone; Fig. 4 a modification of the gearing for a sprocket wheel gearing; Fig. 5 an arrangement of gearing in which a friction coupling is inserted between the driving shaft and the shaft of the driven cone. Fig. 6 is a plan view in detail of the frame and double cone wheel; Fig. 7 is a side view thereof; and Fig. 8 is an end view.

Similar reference characters indicate corresponding parts throughout the several views.

In the drawings with the motor shaft 1 a cone disk 2 is joined between two rings which hold the cone in a distinct position relative to a driven hollow cone 3. The hollow cone 3 is provided with a hub mounted upon a shaft 4 arranged at right angles to the driving shaft 1. Between the cone disk 2 and the hollow cone 3 is a friction wheel 5 adapted to traverse the surface of the cone disk 2 and hollow cone 3, respectively, from the innermost to the outermost edges thereof. The friction wheel 5 consists in a double cone and is rotatively mounted in a frame 6 having an exterior rack 7. For the shifting of the frame 6 is provided a toothed segment 8 in engagement with the said rack 7 and by means of which the friction wheel 5 can be shifted in any desirable position for the purpose of varying the speed imparted from the driving shaft 1 to the hollow cone 3. Said toothed segment 8 may be actuated by any suitable gear mechanism not shown. On the free end of the driving shaft 1 is fixed a clutch member 15′. The latter is adapted to be engaged by a clutch 15 keyed to a driven shaft 16 so as to impart a positive drive from the driving shaft 1 to said driven shaft 16. Also fixed to the driving shaft 1 is a cone 24, the latter adapted to be frictionally engaged by the beveled surface 3′ of the hollow cone 3, and when such engagement is made a reverse movement is imparted from the driving shaft through the medium of the cone 3 to the driven shaft 16, and at a decreased ratio of speed.

To form connection between the cone 3 and the driven shaft 16 is a gear wheel 18 loosely mounted on said latter shaft and which is in mesh with a pinion 23 keyed to the hub of the hollow cone 3 mounted on the shaft 4. To maintain this pinion 23 in normal engagement with the gear wheel 18 is provided a spring 22′ surrounding the hub of the hollow cone 3 and having one end bearing against said cone and the other end against the said pinion. To maintain the gear wheel 18 locked for movement of the driven shaft 16 the clutch 15 is brought into coupling engagement with the clutch member 15″ carried by the gear 18, said clutch 15 being normally coupled with the clutch 15″.

To operate the clutch 15 for coupling the same with the clutch member 15′ to afford a positive drive from the driving shaft 1 to the driven shaft 16 is provided a rod 9 having an enlarged head 9′ and which is mounted in the frame 6. The end opposite the enlarged extremity 9′ of the rod 9 is pivotally connected to a bent bell-crank lever 11, the latter having connection by a link 12 with a forked lever 13 pivoted at 14, the fork of the lever having connection with the clutch 15.

To effect a reverse movement of the driven shaft from a positive drive of the driving shaft 1 the operator actuates the toothed segment 8 so as to cause the movement of the frame 6, thereby changing the position of the double cone friction wheel 5 which will increase or decrease the speed of rotation according to the direction of movement of said friction wheel 5, and the latter being in frictional contact with the hollow cone 3 causes the movement of the latter and through the medium of which imparts movement to the pinion 23 which rotates in the same direction, the latter being in mesh with the gear wheel 18 loosely mounted on the driven shaft 16 and by the clutch 15 keyed to said driven shaft being normally coupled with said pinion 18 thereby imparts a reverse rotary movement to said driven shaft 16. Now to decrease the speed of the driven shaft and to drive the same in the same direction as if coupled directly with the driving shaft 1 the operator shifts the frame 6 by actuating the segment 8 causing said frame 6 to abut against the enlarged extremity 10′ of the rod 10 and through the medium of which a lever 19 pivotally connected thereto and also having connection with the hub of the cone 3 is actuated in a direction to shift the cone 3 so as to bring the beveled surface 3′ into frictional engagement with the cone 24, and when in frictional engagement causes the rotation therewith of the pinion 23 which normally is in mesh with the gear 18, the latter being coupled with the clutch 15 imparts rotation to the driven shaft 16.

If the operator desires to impart a positive drive from the driving shaft 1 to the driven shaft 16, the frame 6 is again moved by the segment 8 until said frame contacts or abuts against the enlarged extremity 9′, thus causing the rod 9 to move shifting the bell-crank lever 11 in opposition to the spring 17 and through the link 12 actuates the forked lever 13 so as to change the position to disengage the clutch from the clutch member 15″ on the gear wheel 18 to cause said clutch 15 to engage the clutch member 15′ fixed on the driving shaft 11, and thereby imparting a positive rotary movement from the driving shaft 1 to the driven shaft 16, and at the same time the hollow cone 3 has been shifted from frictional engagement with the cone 24. To limit the movement of the lever 19 are pins 20 and 21 engaging in slots formed in the said lever 19. On the driven shaft 16 is a gear wheel 35 in mesh with a gear wheel 36 through the medium of which movement is imparted to the driving wheels of a motor car not shown.

In Fig. 5 is shown a modification and mounted on the driving shaft 1 is a gear wheel 28 in mesh with a gear wheel 27, the latter being freely rotatable on the shaft 4 and having a beveled friction wheel 26. Also mounted on the shaft 4 and keyed thereto is a cone wheel 3, the latter adapted to be shifted into frictional contact with the cone 26 so that rotary movement from the driving shaft 1 can be imparted through the gear 28 to the gear 27 rotating the cone 26 and the cone wheel 3 keyed to the shaft 4 and the shaft 4 having a pinion in mesh with a gear 38 carried by a shaft having a chain wheel 37, the latter imparting movement to the driving wheels of a motor vehicle. Keyed to the driving shaft 1 is a friction wheel 24 adapted to be brought into frictional contact with a beveled surface 3′ of the cone wheel 3 and when in frictional contact causes a reverse movement to be imparted from the driving shaft through the medium of the cone 3 to the shaft 4 and from thence through the pinion to the gear wheel 38, and also at a much reduced speed. Now, if it is desired to increase the speed of reverse motion of the gear 38, the cone 3 is shifted into frictional contact with the double cone wheel 5, the latter being in frictional contact with the cone disk 2 which receives its motion from shaft 1 and imparting the same through the double cone wheel 5 to the cone wheel 3 to the shaft 4 through the pinion in mesh with the gear 38. The adjustment of the double cone wheel 5 is identical with that shown in Fig. 1. To shift the cone wheel 3 into contact with the cone 26, the operator manipulates a handle 30 fixed to a shaft 32 having gear wheels 31 in mesh with gear wheels 33, the latter carrying hub sections having an interiorly screw-threaded aperture in engagement with screw-threaded extensions on the shaft 4, and the latter is adapted to be shifted laterally in opposite directions in accordance with the reverse movement of the lever 30. For shifting the cone 24, a rod 25 is provided so that said cone may be shifted longitudinally of the driving shaft 1.

What is claimed is:

1. In frictional gearing of the class described, a driving shaft, a disk cone thereon, a driven shaft arranged at an angle to the first mentioned shaft, a hollow cone roller carried by said driven shaft, and means adapted to be brought into frictional contact with the hollow cone roller to impart rotary movement from the driving shaft to the driven shaft.

2. In frictional gearing of the class described, a driving shaft, a driven shaft at an angle thereto, a cone disk carried by the driving shaft, a hollow cone roller carried by the driven shaft, a shiftable double conical frictional wheel adapted for frictional engagement with the cone disk and cone roller, a cone carried by the driving shaft, said cone roller having a beveled frictional surface for contact with the cone on the driving shaft, and mechanism for shifting the cone roller from contact with the double cone wheel to frictional contact with the cone on the driving shaft to vary the rate of speed of the driven shaft imparted from the driving shaft.

3. In frictional gearing of the class described, a driving shaft, a driven shaft at an angle thereto, a cone disk carried by the driving shaft, a hollow cone roller carried by the driven shaft, a shiftable double conical frictional wheel adapted for frictional engagement with the cone disk and cone roller, a cone carried by the driving shaft, said cone roller having a beveled frictional surface for contact with the cone on the driving shaft, and means for changing the position of frictional contact of the double cone wheel with respect to the cone disk and cone roller.

4. In frictional gearing of the class described, a driving shaft, a hollow cone thereon, a driven shaft arranged at an angle to the first mentioned shaft, a conical roller carried thereby, a shiftable double conical roller coöperative with the hollow cone and conical roller, and mechanism for shifting the said double conical roller for increasing and decreasing the speed of the driven shaft.

5. In frictional gearing of the class described, a driving shaft, a driven shaft arranged at an angle thereto, a hollow cone carried by the driving shaft, a cone roller carried by the driven shaft, a double conical roller interposed between the hollow cone and the conical roller and in frictional contact with the same, mechanism for shifting the double conical roller for increasing and decreasing the speed of the driven shaft with respect to the driving shaft, and clutch mechanism coöperative with the driving and driven shafts.

In testimony whereof we have signed our names to this specification in the presence of two subscribing witnesses.

RUDOLF GAWRON.
JOSEF GAWRON.

Witnesses:
HENRY HASPER,
WOLDEMAR HAUPT.